United States Patent [19]

Kohriyama

[11] 4,124,255
[45] Nov. 7, 1978

[54] NOISE REDUCTION DEVICE FOR USE IN THE UNDERCARRIAGE OF TRACK-TYPE VEHICLES

[75] Inventor: Yoshimasa Kohriyama, Tsukui, Japan

[73] Assignee: Caterpillar Mitsubishi Ltd., Tokyo, Japan

[21] Appl. No.: 804,977

[22] Filed: Jun. 9, 1977

[30] Foreign Application Priority Data

Aug. 31, 1976 [JP]  Japan ................................. 51-104070
Aug. 31, 1976 [JP]  Japan ................................. 51-104071

[51] Int. Cl.² ..................................... B62D 55/20
[52] U.S. Cl. .......................................... 305/41; 305/47
[58] Field of Search .................... 305/41, 42, 43, 47;
  74/247, 245 S, 250 S, 253 S, 255 S

[56] References Cited

U.S. PATENT DOCUMENTS

| 1,405,823 | 2/1922 | Evans | 305/41 X |
| 1,558,432 | 10/1925 | Wilson | 305/41 X |

Primary Examiner—Robert B. Reeves
Assistant Examiner—John P. Shannon
Attorney, Agent, or Firm—John W. Grant

[57] ABSTRACT

A track chain has a plurality of links pivotally connected together in an endless train and a plurality of shoes connected to the links. A noise reduction device for the track chain has a spring connected to the back sides of adjacent shoes and is of a construction sufficient for applying an elastic resistance to pivotal movement of respective pairs of adjoining links.

8 Claims, 12 Drawing Figures

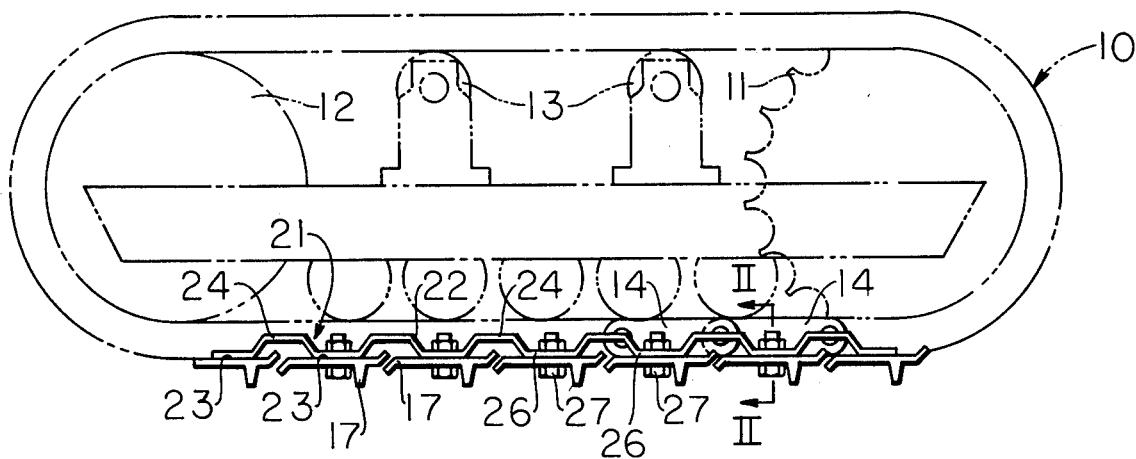
Fig-1-
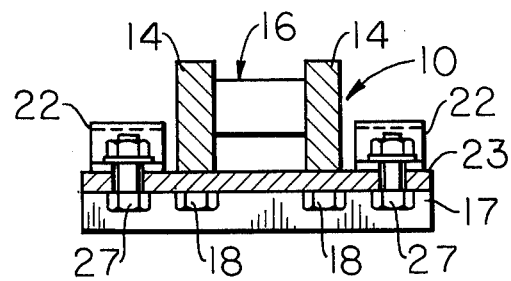
Fig-2-
Fig-3a- 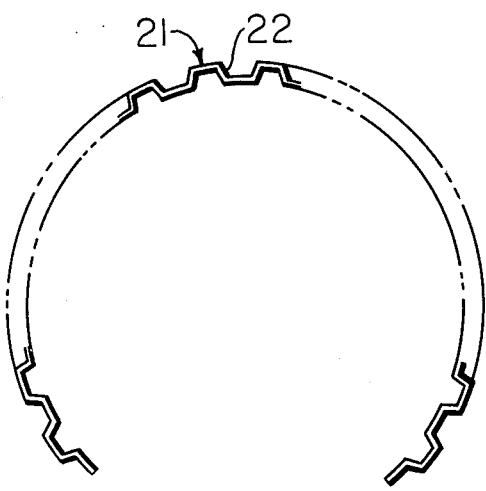 Fig-3b- 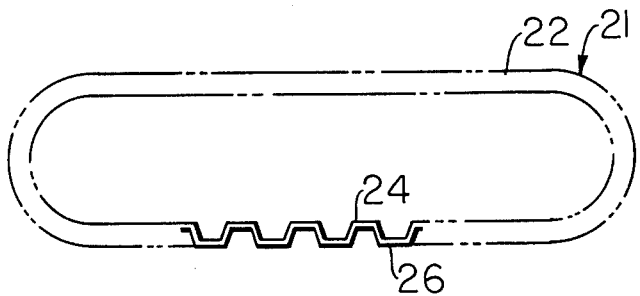

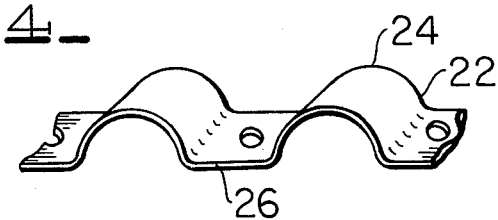
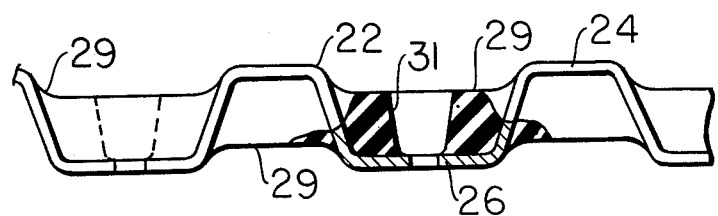
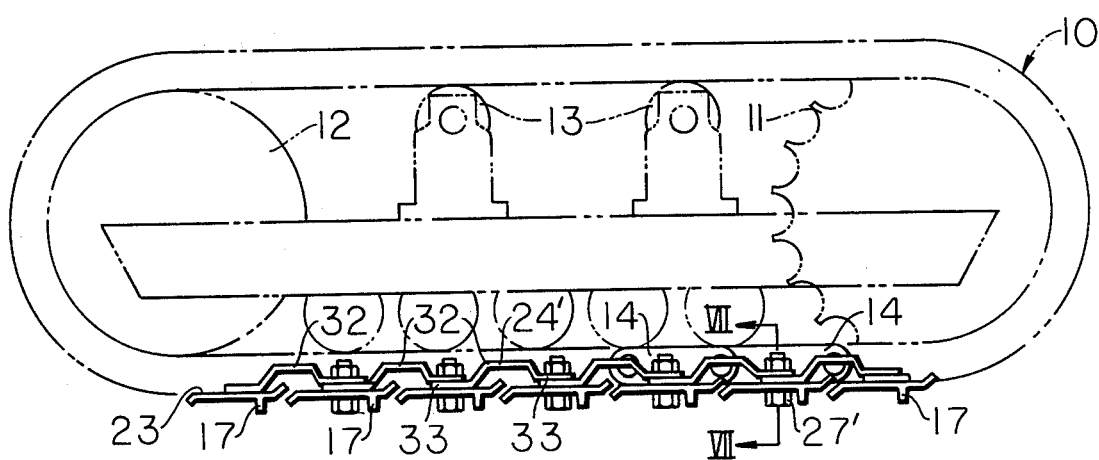

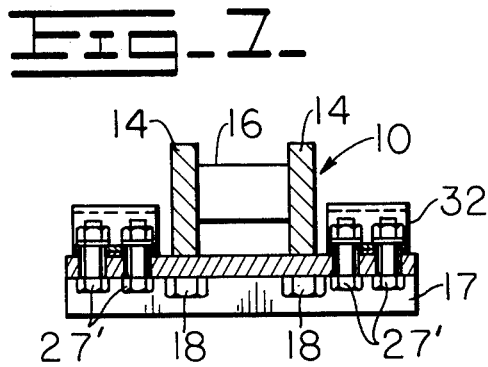
Fig-7-
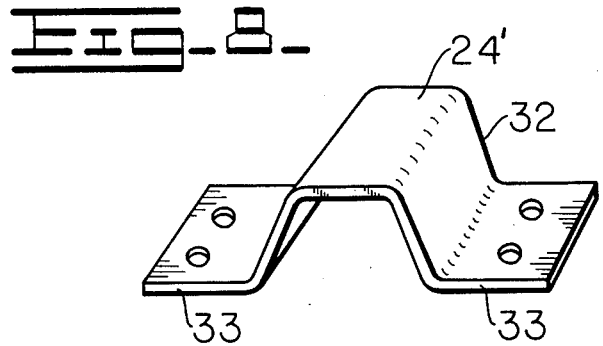
Fig-8-
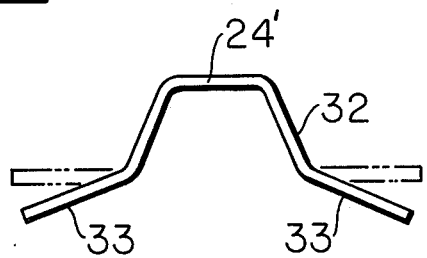
Fig-9-
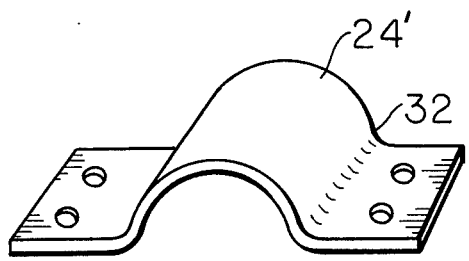
Fig-10-
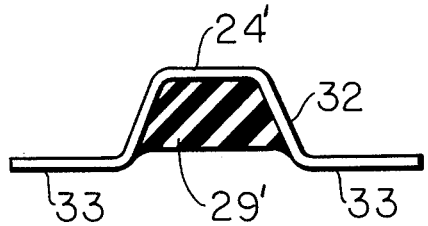
Fig-11-

NOISE REDUCTION DEVICE FOR USE IN THE UNDERCARRIAGE OF TRACK-TYPE VEHICLES

BACKGROUND OF THE INVENTION

This invention relates to a device for reducing the level of noises arising from an undercarriage of a track-type vehicle.

As is well known, noises arise from an undercarriage of a track-type vehicle equipped with track chains. The noises are considered to arise between the teeth of the sprocket and bushings interconnecting the track links, between the rolling surfaces of the idler and the track links, and between the rolling surface of the carrier roller and the track links. The noises are so-called metal-to-metal contacting noises which result from impact of one metal member upon another and can be attributed in part to vibrations in the track chain when it is slackened. Hitherto, many attempts have been proposed to eliminate the metal-to-metal contact. In one example, rubber pads are secured to the sides surfaces of a sprocket or the flange surfaces of a carrier roller or an idler for providing for the contact with the track links, i.e., rubber pads are imposed between metal contacting surfaces, thereby absorbing or moderating impact sounds. However, these attempts suffer from premature damage or wear of the rubber pads themselves because the rubber pads have to contact movable portions of track links and the like and thus the rubber pads provide a short service life. In addition, the provision of the aforesaid rubber pads leads to a need to modify the construction of the undercarriage and hence poses an economical problem.

The present invention is directed to avoiding the aforesaid shortcomings in the prior art by providing a noise reduction device for use in an undercarriage of a track-type vehicle which provides a long service life and high reliability and allows the attachment of the device to a conventional track-type vehicle with minimized modification.

According to the present invention, there is provided a noise reduction device for a track chain of a track-type vehicle, said track chain having a plurality of links pivotally connected together in an endless train and a plurality of track shoes connected to the links. Each track shoe has a back side. The noise reduction device comprises a spring connected to the back sides and is of a construction sufficient for applying an elastic resistance to pivotal movement of respective pairs of adjoining links.

BRIEF DESCRIPTION OF THE DRAWINGS

FIG. 1 is a diagrammatic side elevational view of an undercarriage having the apparatus of this invention.

FIG. 2 is a cross sectional view taken along the line II—II of FIG. 1.

FIGS. 3a and 3b are views of the spring of this invention before and after being connected to a track chain.

FIGS. 4 and 5 are views showing modification of the spring according to the present invention.

FIG. 6 is a diagrammatic view showing another modification of the present invention.

FIG. 7 is a sectional view taken along line VII—VII of FIG. 6.

FIG. 8 is a perspective view of a spring of the apparatus shown in FIG. 6.

FIG. 9 is a view of the spring of the present apparatus before being connected to the track shoes.

FIGS. 10 and 11 are other embodiments of the apparatus of FIG. 6.

DETAILED DESCRIPTION

Referring now to FIGS. 1 and 2 of the drawings, a pair of endless track chains 10 are trained around a sprocket 11, an idler 12 and a pair of carrier rollers 13. Each of the track chains includes a plurality of adjoining track links 14 pivotally coupled together by track pin assemblies 16. Each of a plurality of track shoes 17 is connected to adjacent links of each pair of track chains by bolts 18. The track shoe and the links to which the shoe is connected constitute respective link-shoe assemblies. The above-described basic elements are all well known in the art.

A noise reduction device 21 according to the present invention, has a pair of springs 22 positioned on opposite sides of the links 14, each spring being connected to back sides 23 of adjacent track shoes 17. Each of the springs can be constructed of a corrugated metal plate spring having concave and convex portions 24, 26 at a given pitch, the direction of the corrugation thereof being transverse to the run of the track chains 10. The concave portions 24 straddle the space between adjoining or adjacent track shoes 17. The convex portions provide attaching portions, each of which is connected to the back side of a respective track shoe by a bolt 27.

Thus, the respective adjoining link shoe assemblies are given elastic resistances during their pivotal movement about the track pin assembly 16 with the result that the track chains are resiliently held so as to maintain a linear run. The springs 22 do not hinder the smooth engagement between the sprocket 11 and idler 12 or contact of the track chains 10 with the sprocket or idler. Accordingly, the noise reduction device substantially eliminates the slack in the linear portion of the track chains between the sprocket 11 and idler 12 with the track chains resiliently held so as to be pushed outwardly. As a result, vibrations of the track chains during the running of the vehicle are minimized and the track chains smoothly engage or contact the sprocket, idler and carrier rollers thereby reducing the noises arising from the undercarriage of the vehicle. In addition, for providing an optimum confiugration for maintaining the track chains free of slackening as well as an optimum spring constant to the spring, each of the springs is formed into a circular shape as shown in FIG. 3a before being connected to the track shoes 17. After the spring is connected to the track shoes, the spring is deformed into a shape as shown in FIG. 3b. To this end, the spring should preferably be given a preset or spring back before it is connected to the track shoe so that the spring is in a preloaded condition when it is connected to the shoes.

FIG. 4 shows another embodiment of the invention in which the concave portions 24 of each spring 22 is formed into an arcuate shape thereby changing the spring constant.

FIG. 5 shows another embodiment of the invention in which the concave and convex portions 24, 26 of the spring 22 are filled with an elastomer 29 which is fixedly retained therein. A hole 31 is provided in the elastomer in the convex portion for receiving the bolts 27. By filling the concave and convex portions with elastomer, the spring constant of the spring can be increased and in addition metal-to-metal impact sound may be absorbed or moderated by the elastomer.

Referring now to FIG. 6, another embodiment is shown in which a plurality of spring members 32 are secured to the back sides 23 of the track shoes 17 but on opposite sides of the track links 14. Each of the springs 32 is made of a one-piece metal plate spring including a flat attaching portion 33 on opposite sides of the concave portion 24' which interconnects both attaching portions with the bottom of the concave portion being directed in the direction in which the track chain is to be bent around the sprocket or idler. The concave portion of each spring straddles the space between adjacent or adjoining track shoes 17. As a result, the adjoining link shoe assemblies are given elastic resistances during their pivotal movements.

For providing an optimum configuration to the track chains 10 which is free of slackening, as well as an optimum spring constant to the springs 32, the springs are formed into a shape as shown by the solid line in FIG. 9 before being connected to the track shoes of the track chain. After being connected to the track shoes, the spring is deformed into a shape as shown by broken lines. To this end, the springs 32 should preferably be given spring back or a free state configuration so that the spring is in a preloaded condition after it is connected to the track shoes.

FIG. 10 shows another embodiment of the invention in which the concave portions 24' of the spring 32 are formed into a curved configuration thereby varying its spring constant. The shape of the spring member according to the present invention, however, should by no means be limited to this instance but various configurations may be adopted therefor for varying its spring constant.

FIG. 11 shows another embodiment of the invention in which the concave portion 24' is filled with an elastomer 29' which is fixedly retained therein. Although not shown, the spring 32 of the present invention can be of a configuration which interconnects three or four link shoe assemblies 19.

As is apparent from the foregoing description, the noise reduction device according to the present invention provides a long service life and high reliability. In addition, the noise reduction device allows its attachment to a conventional-type track chain with ease and simple modification. In other words, it suffices that both holes should only be provided in the track shoes for attaching the spring members to the track shoes thereby reducing a manufacturing cost to a large extent. Furthermore, the springs are provided in the form of segments thereby facilitating the attachment and removal and hence the replacement of the springs to and from the track chain.

The embodiments of the invention in which an exclusive property or privilege is claimed are defined as follows:

1. A noise reduction device for a track chain of a track-type vehicle, said track chain having a plurality of links pivotally connected together in an endless train and a plurality of track shoes connected to the links, each track shoe having a backside, said noise reduction device comprising a spring connected to the backside of adjacent shoes and being of a construction sufficient for applying an elastic resistance to pivotal movement of respective pairs of adjoining links, said spring being constructed from a corrugated metal plate spring having concave and convex portions, the direction of the corrugation being transverse to the run of said track chain.

2. The noise reduction device as set forth in claim 1 wherein said spring is connected to said track shoes in a preloaded condition.

3. The noise reduction device as set forth in claim 1 wherein the concave and convex portions are filled with an elastomer.

4. The noise reduction device as set forth in claim 1 wherein said spring is positioned at one side of said links, and including another spring connected to the back side of adjacent shoes and being positioned at the opposite side of said links.

5. A noise reduction device for a track chain of a track-type vehicle, said track chain having a plurality of links pivotally connected together in an endless train and a plurality of track shoes connected to the links, each track shoe having a backside, said noise reduction device comprising a spring connected to the backsides of adjacent shoes and being of a construction sufficient for applying an elastic resistance to pivotal movement of respective pairs of adjoining links, said spring being constructed of a metal plate spring having a flat attaching portion and a concave portion interconnecting said attaching portions, the concave portion being positioned in the direction in which said track chain is to be pivoted.

6. The noise reduction device as set forth in claim 5 wherein said spring is connected to the track shoes in a preloaded condition.

7. The noise reduction device as set forth in claim 5 wherein said concave portion is filled with an elastomer.

8. The noise reduction device as set forth in claim 5 including a plurality of springs each connected to the back sides of adjacent shoes.

* * * * *